July 24, 1951   H. LENT   2,561,521
MIXING TROWEL
Filed Nov. 27, 1946
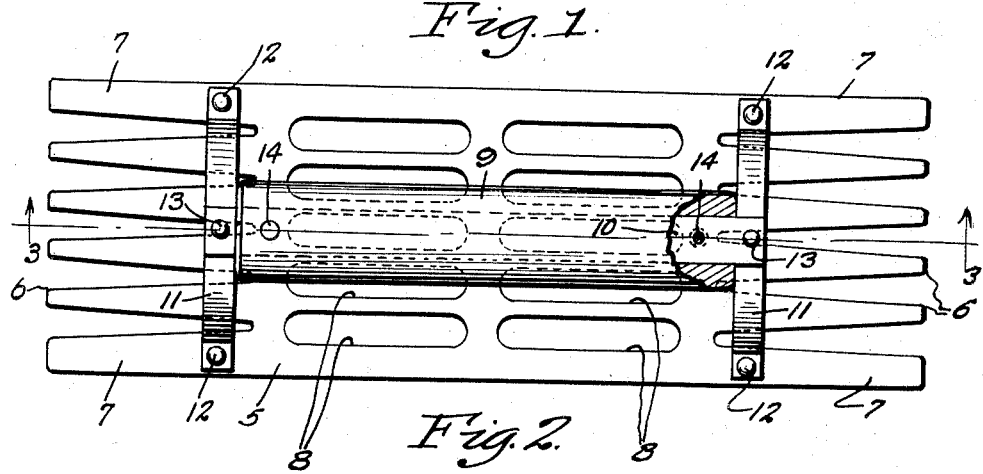
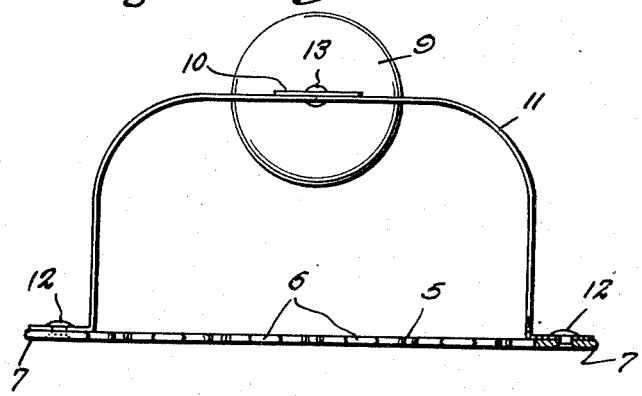
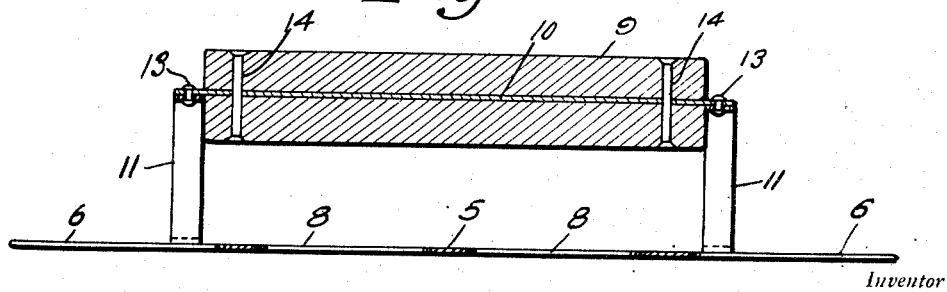
Inventor
HERBERT LENT
By Clarence A. O'Brien
and Harvey B. Jackson
Attorneys Patented July 24, 1951

2,561,521

UNITED STATES PATENT OFFICE 2,561,521

MIXING TROWEL

Herbert Lent, El Dorado, Kans.

Application November 27, 1946, Serial No. 712,664

2 Claims. (Cl. 72—136)

This invention relates to a new and useful trowel adapted for use in mixing the materials or ingredients used to produce the plaster which is ordinarily applied to and spread upon surfaces for construction of walls.

It is extremely difficult and often practically impossible to thoroughly mix the ingredients of wall plaster by means of an ordinary plaster spreading trowel. As a result of this, the plaster is not of uniform texture and is often applied with streaks of lime putty therethrough unassociated with the plaster of Paris or cement. Thus, when the plaster sets, it has weak places or streaks therein.

The primary object of the present invention, therefore, is to provide a trowel by means of which the ingredients of wall plaster may be readily and thoroughly mixed to provide a plaster of uniform texture and strength.

A further object of the invention is to provide a mixing trowel of the above kind which is simple and durable in construction, highly efficient in use, and otherwise well adapted for its intended function.

The exact nature of the present invention, as well as other objects and features thereof, will become apparent from the following description when considered in connection with the accompanying drawings, in which:

Figure 1 is a top plan view, partly broken away and in section, of a mixing trowel constructed in accordance with the present invention;

Figure 2 is an enlarged end elevational view of the trowel shown in Figure 1;

Figure 3 is a central longitudinal section taken on line 3—3 of Figure 1.

Referring in detail to the drawing, the illustrated embodiment of the invention includes a thin metal blade 5 which is of general oblong rectangular shape and has its opposite ends serrated to provide a series of longitudinal elongated teeth 6 and 7 at each end of the blade. The teeth are of outwardly tapering form and uniformly spaced apart, as well as provided with rounded edges and rounded outer or free ends. The teeth 7 are the outermost teeth of each series and are wider than the remaining teeth of such series.

Adjacent the inner ends of the teeth of each series, the blade 5 is provided with a transverse series of longitudinally elongated slots 8, each slot 8 being in longitudinal alignment with the space between two adjacent teeth of the adjacent series. The side edges of the blade 5 and the edges of said blade within the slots 8 are also rounded as clearly shown in Figures 2 and 3. Also, the outer side edges of the outermost teeth 7 are straight and coextensive with the side edge portions of the blade 5 between the two series of teeth.

The blade 5 has a centrally and longitudinally disposed handle composed of a cylindrical hand grip 9 and an elongated metal strip 10 extended through and projecting beyond the ends of said hand grip. This handle is attached at its ends to the opposite end portions of the blade 5 by means of transverse supporting arches 11, the ends of which are rigidly attached by riveting or the like as at 12 to the blade 5 at opposite sides of the latter and upon the inner ends of the outermost teeth 7. The projecting ends of the strip 10 are disposed upon and riveted or otherwise rigidly secured upon intermediate portions of the arches 11 as at 13. The arches 11 consist of inverted U-shaped pieces of strip metal, and the hand grip 9 has a central bore therethrough of a form and size to snugly receive the strip 10. Rivets 14 or the like are provided to secure the hand grip 9 and strip 10 against relative longitudinal displacement.

In describing the use of the trowel, we will assume that a quantity of plaster of Paris or cement and water ringed or surrounded by slacked lime putty has been placed on a mixing board as usual, and that it is desired to mix these materials or ingredients in order to produce the plaster to be applied to and spread upon surfaces for construction of walls. With the trowel grasped by the handle, the workman disposes the longitudinal plane of the blade in an angular position with respect to the mixing board and, by downward pressure, causes the teeth at the lower end of the blade to engage and penetrate the slacked lime putty at one side of the batch of materials. The trowel is then given a longitudinal movement with the mentioned teeth trailing through the materials in the direction of movement of the trowel. The trowel is then tilted in the opposite direction so as to cause the teeth at the other end of the blade to engage and penetrate the lime putty at the opposite side of the batch, whereupon the trowel is moved longitudinally in the opposite direction. Upon repeating this operation by alternately pulling and pushing the trowel and changing its course of travel, the entire batch of materials may be thoroughly and intimately mixed in an expeditious manner and without undue strain or labor on the part of the workman, so as to produce a plaster of uniform cream-like texture which will be of uniform strength throughout after being applied and allowed to set. As the trowel is moved, the materials are readily broken down and divided by the teeth, some of the materials passing upwardly through the slots 8 adjacent the teeth engaged with the materials and mixing with the portions of the materials which pass upwardly between such teeth. The free ends of the teeth and the edges of the blade are rounded to avoid cutting the mixing board, and the outermost teeth 7 are made wider than the rest of the teeth so that they can be used with the adjacent intermediate side edge portion of the blade to shove the materials toward the center of the mixing board from time to time to keep them from falling off of the board. The transverse supporting arches 11 for the handle will readily pass through the materials above the blade, and they provide for effective application of pressure to either side of the blade near both ends thereof.

From the foregoing description, it is believed that the construction, manner of use and advantages of the present invention will be readily understood and appreciated by those skilled in the art. It is to be understood that the invention is susceptible of modification and changes in details of construction illustrated and described, such as fairly fall within the scope of the invention as claimed.

What I claim is:

1. A wall plaster mixing trowel comprising a single thin flat blade of general oblong rectangular shape and longitudinally serrated at one end to provide a series of uniformly spaced longitudinal elongated teeth, said blade being provided with a transverse series of longitudinal elongated slots adjacent to and inwardly of said teeth, each of said slots being longitudinally aligned with the space between adjacent ones of said teeth, and an elongated handle directly attached to and disposed over and longitudinally of the blade intermediate the ends of the latter.

2. A wall plaster mixing trowel comprising a single thin flat blade of general oblong rectangular shape and being longitudinally serrated at opposite ends to provide a series of uniformly spaced longitudinal elongated teeth, said blade being provided with a transverse series of longitudinal elongated slots spaced adjacent to and inwardly of said teeth, each of said slots being longitudinally aligned with the space between adjacent ones of said teeth.

HERBERT LENT.

REFERENCES CITED

The following references are of record in the file of this patent:

UNITED STATES PATENTS

| Number | Name | Date |
|---|---|---|
| 398,781 | Hovey | Feb. 26, 1889 |
| 1,083,099 | Howg | Dec. 30, 1913 |
| 1,642,416 | Freni | Sept. 13, 1927 |
| 2,167,996 | Pritz | Aug. 1, 1939 |
| 2,395,186 | Jones | Feb. 19, 1946 |